US010821775B2

(12) United States Patent
Verheye

(10) Patent No.: US 10,821,775 B2
(45) Date of Patent: Nov. 3, 2020

(54) DUAL WHEEL SYSTEM AND INSTALLATION THEREOF

(71) Applicant: CNH Industrial America LLC, New Holland, PA (US)

(72) Inventor: Carlos Verheye, Roeselare (BE)

(73) Assignee: CNH Industrial America LLC, New Holland, PA (US)

( * ) Notice: Subject to any disclaimer, the term of this patent is extended or adjusted under 35 U.S.C. 154(b) by 203 days.

(21) Appl. No.: 15/976,137

(22) Filed: May 10, 2018

(65) Prior Publication Data

US 2019/0344614 A1 Nov. 14, 2019

(51) Int. Cl.
*B60B 11/02* (2006.01)
*B60B 3/14* (2006.01)
*B60B 21/02* (2006.01)

(52) U.S. Cl.
CPC .............. *B60B 11/02* (2013.01); *B60B 3/147* (2013.01); *B60B 21/02* (2013.01); *B60B 2310/302* (2013.01); *B60B 2360/102* (2013.01); *B60B 2360/104* (2013.01)

(58) Field of Classification Search
CPC ........... B60B 11/00; B60B 11/02; B60B 3/14; B60B 3/147
See application file for complete search history.

(56) References Cited

U.S. PATENT DOCUMENTS 1,994,375 A 3/1935 Wagenhorst
2,054,225 A 9/1936 Lewis
2,343,129 A 2/1944 Ash
2,507,285 A 5/1950 Temple
2,636,783 A 4/1953 Canady et al.
2,698,566 A 1/1955 Stough
3,847,441 A 11/1974 Morkoski et al.
4,070,066 A 1/1978 Reppert et al.
4,135,765 A * 1/1979 Hardwicke ............ B60B 11/06 301/128
4,585,276 A * 4/1986 Tirheimer ............... B60B 11/06 301/128
4,639,044 A * 1/1987 Enders .................... B60B 3/008 301/35.625

(Continued)

FOREIGN PATENT DOCUMENTS

BR 8302373-9 U 4/2005
DE 1802772 A1 5/1970

(Continued)

*Primary Examiner* — Jason R Bellinger
(74) *Attorney, Agent, or Firm* — Peter Zacharias; Patrick Sheldrake

(57) ABSTRACT

A dual wheel system includes a first wheel, a second wheel, and a transition plate arranged between the first and second wheels. Each wheel includes a rim with a disk positioned transverse to a longitudinal axis. The disk of the first wheel has a first plurality of holes arranged concentric about the longitudinal axis with a first bolt pattern, and the disk of the second wheel has a second plurality of holes arranged concentric about the longitudinal axis with a second bolt pattern. The transition plate includes an outer ring of holes for fastening the wheels to the transition plate via the first and second plurality of holes, and an inner ring of holes for fastening the transition plate to an axle flange of a work vehicle.

14 Claims, 4 Drawing Sheets

(56) References Cited

U.S. PATENT DOCUMENTS

| | | | | |
|---|---|---|---|---|
| 4,718,732 | A * | 1/1988 | Osborne | B60B 3/147 301/128 |
| 4,787,679 | A * | 11/1988 | Arnold | B60B 11/06 301/13.2 |
| 4,822,108 | A | 4/1989 | Benhart | |
| RE38,779 | E * | 8/2005 | Lovitt, Jr. | B60B 3/044 301/111.01 |
| 7,331,637 | B2 * | 2/2008 | Hill | B60B 11/06 301/35.628 |
| 7,419,226 | B2 * | 9/2008 | Jenkinson | B60B 3/147 301/105.1 |
| 8,690,265 | B2 * | 4/2014 | Noblanc | B60B 11/02 301/36.1 |
| 2013/0234496 | A1 * | 9/2013 | Gengerke | B60B 11/02 301/35.628 |
| 2015/0123453 | A1 * | 5/2015 | Benoit, Jr. | B60B 11/02 301/35.628 |

FOREIGN PATENT DOCUMENTS

| | | | |
|---|---|---|---|
| DE | 19607757 | A1 | 9/1996 |
| DE | 102008021790 | A1 | 11/2009 |
| EP | 0921017 | A1 | 6/1999 |
| GB | 246824 | A | 8/1926 |
| GB | 634319 | A | 3/1950 |
| JP | S58164411 | A | 9/1983 |
| KR | 20130142599 | A | 12/2013 |

* cited by examiner

DUAL WHEEL SYSTEM AND INSTALLATION THEREOF

BACKGROUND OF THE INVENTION

The present invention relates to a dual wheel system and installation thereof, and more particularly, to a dual wheel system for work vehicles and a method for installing the dual wheel system on work vehicles.

Agricultural vehicles, such as combine harvesters, typically include a front set of dual wheel assemblies, particularly to distribute the weight of the vehicle, most of which is located forward, over a greater surface area of the ground, thereby enabling the vehicle to work in wet and/or even muddy conditions. Conventional dual wheel assemblies are configured such that the outer wheel may be removed, which is particular economical when the vehicle is harvesting or moving on firm ground or moving along paved or hardened roads when traveling between fields. However, as agricultural vehicles become larger and heavier, there is a need to have dual wheel assemblies that accommodate wider tires, are cost effective to manufacture, handle the extra stress introduced by the larger tire sizes, and still allow an operator to easily remove or add an outer wheel to the dual wheel assembly without the assistance of others.

What is needed in the art is a dual wheel system and a method of installation/replacement thereof that can overcome some of the disadvantages of known dual wheel assemblies.

SUMMARY OF THE INVENTION

The present invention is directed to a dual wheel system for work vehicles and a method of installing the dual wheel system on work vehicles.

In accordance with an aspect of the present invention, a dual wheel system for use with a work vehicle includes a first wheel including a rim with a disk positioned transverse to a longitudinal axis, the disk of the first wheel having a first plurality of holes arranged concentric about the longitudinal axis with a first bolt pattern, a second wheel including a rim with a disk positioned transverse to the longitudinal axis, the disk of the second wheel having a second plurality of holes arranged concentric about the longitudinal axis with a second bolt pattern, and a transition plate arranged between the first wheel and the second wheel, the transition plate including an inner ring of holes and an outer ring of holes, the outer ring of holes including a first subset of holes and a second subset of holes, the first subset of holes aligning with the first plurality of holes of the first wheel and fastened therewith via a first plurality of fasteners, the second subset of holes aligning with the second plurality of holes of the second wheel and fastened therewith via a second plurality of fasteners, the inner ring of holes being fastened with an axle flange of the work vehicle via a third plurality of fasteners.

According to another aspect of the invention, the first subset and second subset of holes of the outer ring of holes of the transition plate are threaded, the first plurality of holes of the first wheel and the second plurality of holes of the second wheel are threaded, and the first and second plurality of fasteners are threaded bolts.

According to another aspect of the invention, the third plurality of fasteners are threaded bolts.

According to another aspect of the invention, the third plurality of fasteners further include spacers.

According to another aspect of the invention, the rim of the first and second wheels are configured to receive a 710 mm wide tire.

According to another aspect of the invention, the disk includes a tube and a rim extension segment, said tube having a first end and a second end opposite said first end, said first end connected to said rim extension segment, said tube arranged concentric about said longitudinal axis and extending along said longitudinal axis, said second end having a ring, said ring having the first plurality of holes of the first wheel and the second plurality of holes of the second wheel.

According to another aspect of the invention, a distance between the second end of the tube of the first wheel and a center of the first wheel is a first offset distance, a distance between the second end of the tube of the second wheel and a center of the second wheel is a second offset distance, and the first and second offset distances are 430 mm, and a width of the transition plate is 30 mm.

According to another aspect of the invention, a distance between the second end and the first end of the tube of the first wheel is 204 mm, and a distance between the second end and the first end of the tube of the second wheel is 204 mm.

According to another aspect of the invention, a diameter of the inner ring of holes of the transition plate is 335 mm.

According to another aspect of the invention, the inner ring of holes of the transition plate includes 20 holes.

According to another aspect of the invention, each hole of the inner ring of holes of the transition plate has a same diameter.

According to another aspect of the invention, the first subset of holes of the outer ring of holes includes 15 holes, the first plurality of holes of the first wheel includes 15 holes, the second subset of holes of the outer ring of holes includes 15 holes, the second plurality of holes of the second wheel includes 15 holes, and each hole of the first and second plurality of holes has a same diameter.

According to another aspect of the invention, a work vehicle includes two front wheel assemblies and two back wheel assemblies, and at least each of the two front wheel assemblies includes the dual wheel system described herein.

In accordance with an aspect of the present invention, a method of replacing an existing wheel assembly of a work vehicle with a replacement wheel assembly is provided. The method includes removing the existing wheel assembly from an axle flange of the work vehicle and fastening the replacement wheel assembly to the axle flange of the work vehicle. The replacement wheel assembly includes the dual wheel system as described herein, and fastening the replacement wheel assembly includes fastening the first wheel to the transition plate by placing the first plurality of fasteners through the first plurality of holes of said disk of the first wheel into the first subset of holes of the outer ring of holes of the transition plate, fastening the transition plate to the axle flange of the work vehicle via the third plurality of fasteners placed through the inner ring of holes of the transition plate, and fastening the second wheel to the transition plate by placing the second plurality of fasteners through the second plurality of holes of said disk of the second wheel into the second subset of holes of the outer ring of holes of the transition plate. The first wheel is an inner wheel and the second wheel is an outer wheel.

Advantages of the system described herein is to provide dual wheel assemblies including wheels having components such as rims and disks that are less susceptible to the large stresses that are produced, particularly in wheels having rims that accommodate wider tires, thereby reducing the probability of metal fatigue and/or failure, and reducing the cost of manufacture of such dual wheel systems by replacing the conventional disks that consist of extensions of the rims for producing the necessary offset between wheels with disks including a combination of tubes and shorter rim extension segments. The tubes may be connected to the rim extension segments via welds.

An advantage of the method described herein is to provide an easier and more cost-effective way to retrofit wheel assemblies of work vehicles with the dual wheel system of the present invention. In addition, removal, or replacement of the outer wheel of the dual wheel system of the present invention may be accomplished more easily by an operator. That is, the transition plate remains connected to the inner wheel when the outer wheel is removed, and thus the center of gravity of the outer wheel remains closer to the geometric center of the wheel as compared to conventional outer wheels, thereby allowing the operator to roll and otherwise transport the outer wheel more easily.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
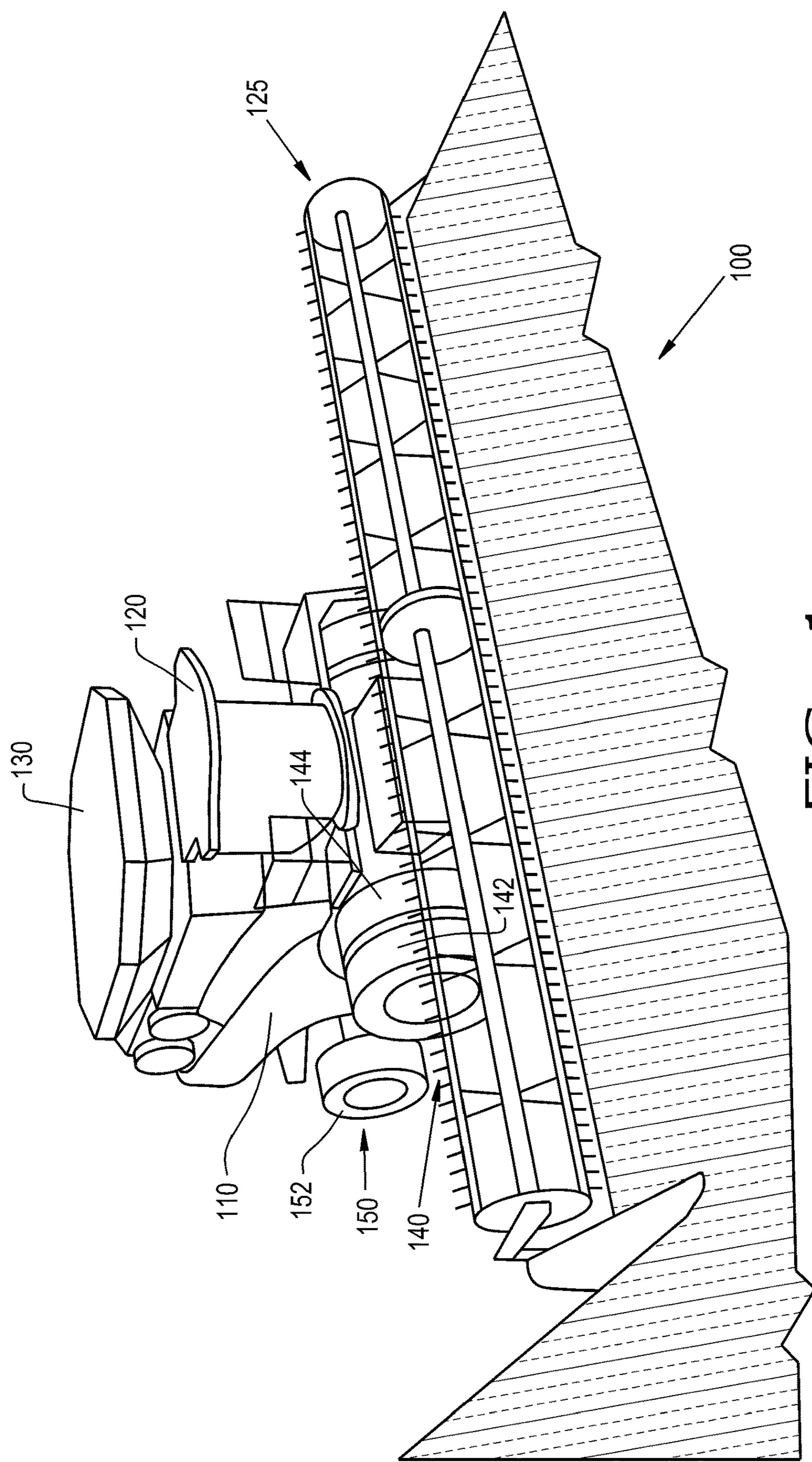
FIG. 1 is a perspective view of a work vehicle, according to an embodiment of the present invention.

Referring now to the drawings, and more particularly to FIG. 1, a work vehicle 100 is illustrated according to an embodiment of the present invention. Although the work vehicle 100 is in the form of a combine harvester, other embodiments of the present invention cover other types of work vehicles for use in, for example, commercial, industrial, forestry, and agricultural applications (e.g., agricultural tractors). The work vehicle 100 includes a chassis 110, a cab 120, a crop collecting system 125, a crop storage container 130, two front wheel assemblies 140 (only one of which is shown) and two back wheel assemblies 150 (only one of which is shown). In all aspects, the chassis 110, the cab 120, the crop collecting system 125 and the crop storage container 130 are conventionally configured components of typical combine harvesters and will not be described in further detail.

Figure 3:
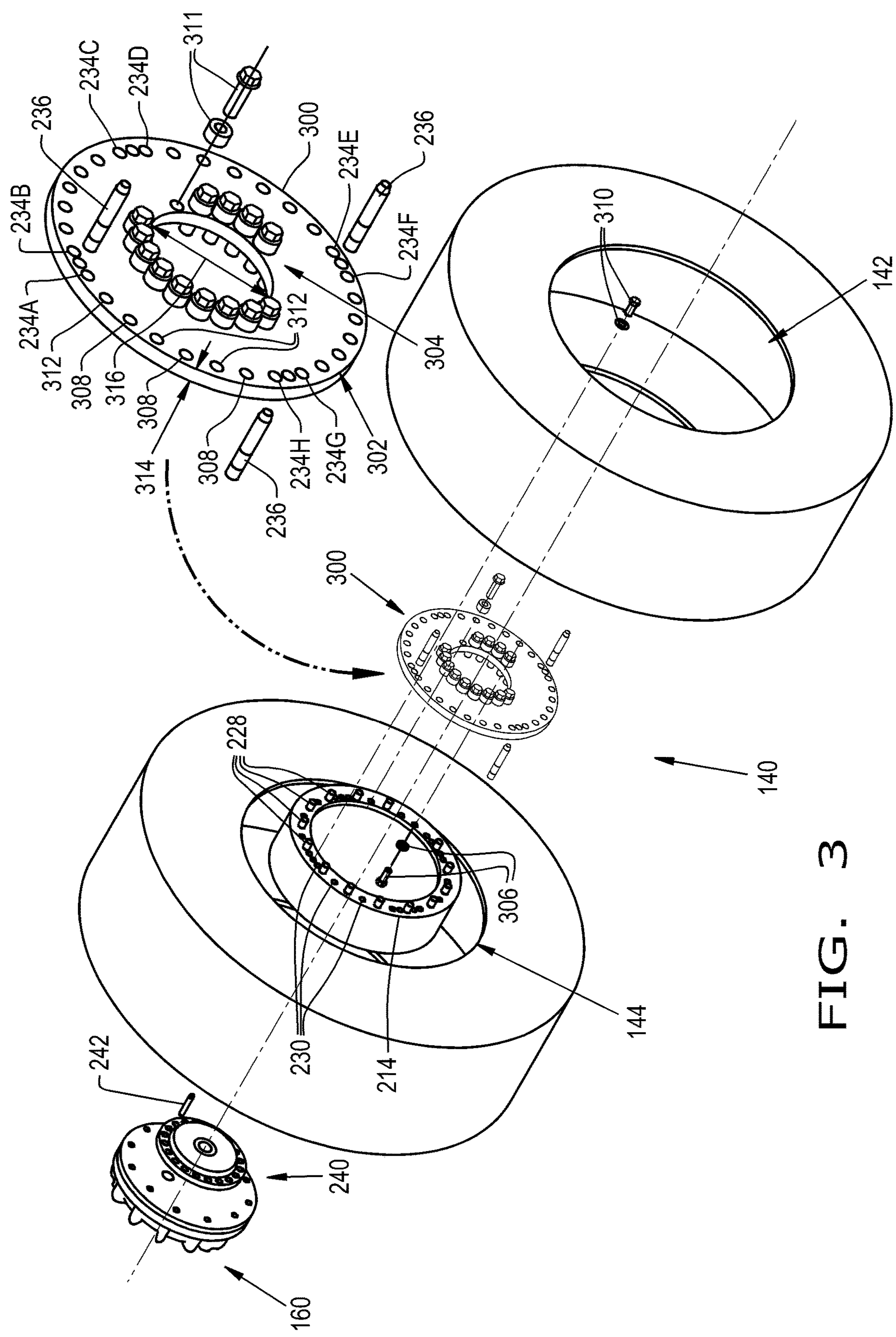
FIG. 3 is an explosive view of the dual wheel system of FIG. 1, according to an embodiment of the present invention.

The wheel assemblies 140, 150 are mounted to respective axle flanges 160 (see FIG. 3). The axle flanges 160 may be considered components of the chassis 110. As illustrated, the front wheel assembly 140 (also referred to as dual wheel system 140) includes dual wheels (i.e., an outer wheel 142 and an inner wheel 144), whereas the back wheel assembly 150 include a single wheel 152, although the scope of the present invention covers back wheel assemblies 150 including dual wheels as well. The scope of the present invention covers all work vehicles that may be fitted with dual wheel assemblies.

Figure 2A:
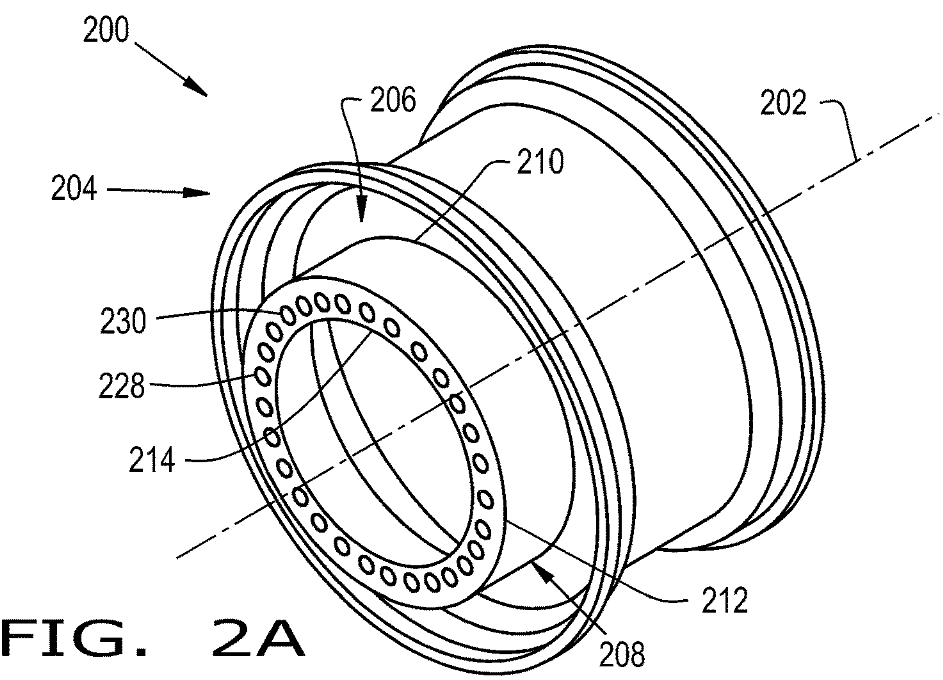
FIG. 2A is a perspective view of a wheel of the dual wheel system of FIG. 1, according to an embodiment of the present invention.
Figure 2B:
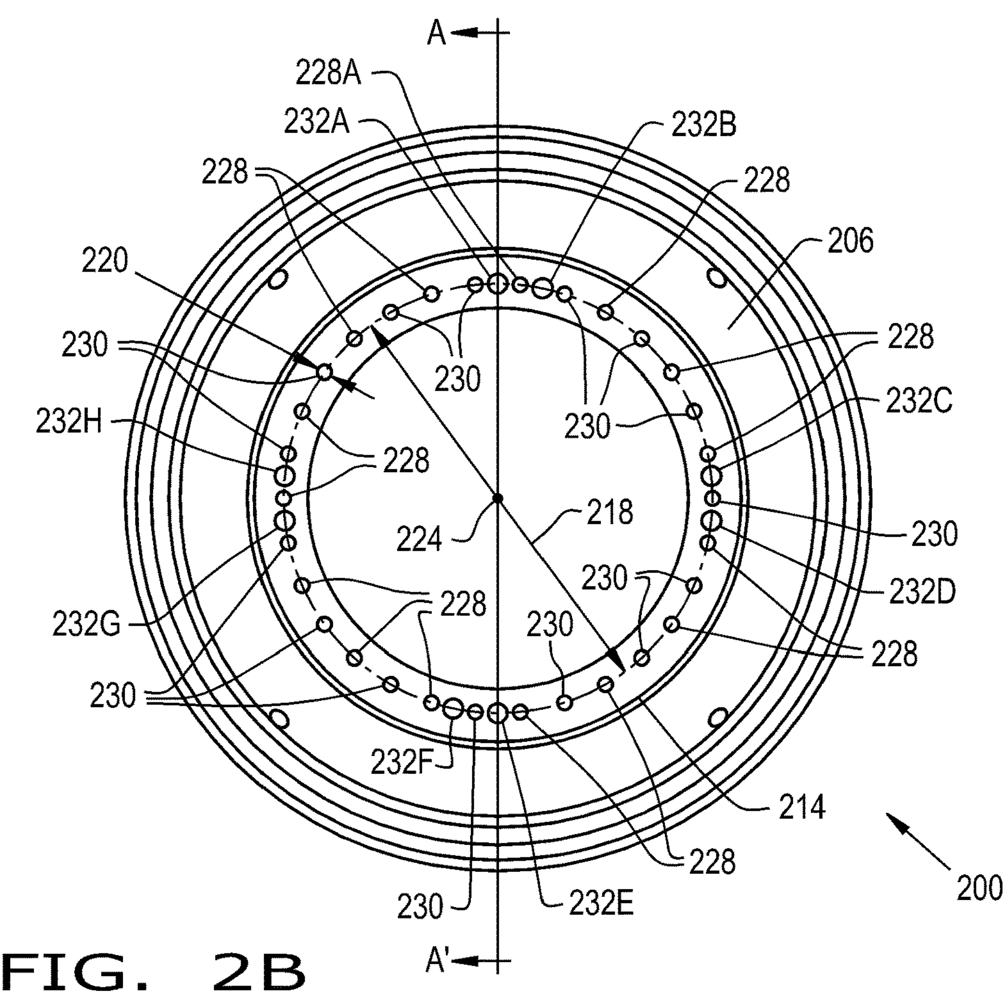
FIG. 2B illustrates the wheel of FIG. 2A viewed along the longitudinal axis, according to an embodiment of the present invention.
Figure 2C:
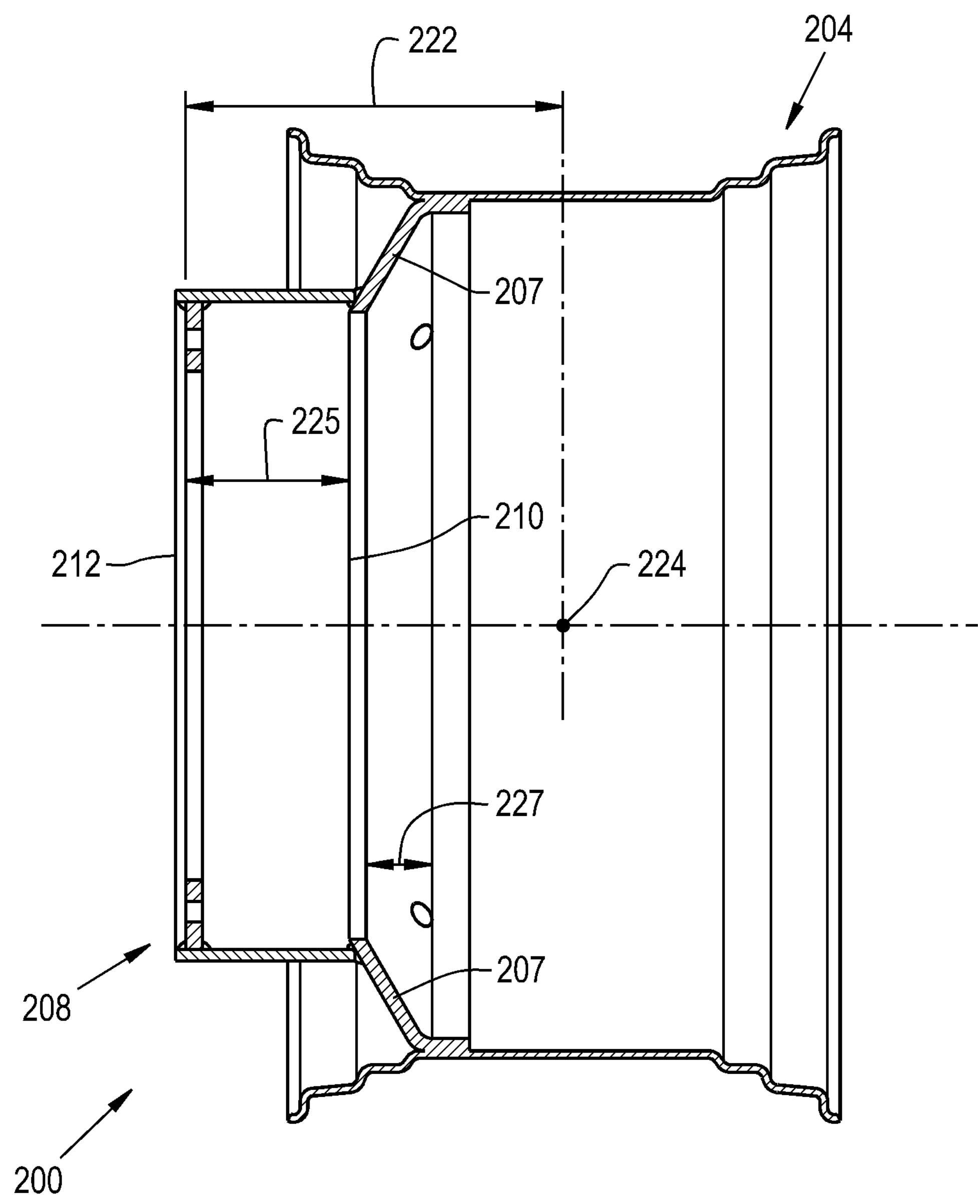
FIG. 2C is a section view A-A' of the wheel of FIG. 2B, according to an embodiment of the present invention.

FIGS. 2A-2C show a wheel 200 of the dual wheel system 140 illustrated in FIG. 1, according to an embodiment of the present invention. The wheel 200 may be either the outer wheel 142 or the inner wheel 144 of the dual wheel system 140, since the outer and inner wheels are symmetric with respect to one another.

More specifically, FIG. 2A is an isometric view of the wheel 200. The wheel 200 includes a longitudinal axis 202, and a rim 204 having a disk 206 positioned transverse to the longitudinal axis 202. The disk 206 of the wheel 200 has a first plurality of holes 228 arranged concentric about the longitudinal axis 202 with a first bolt pattern and a second plurality of holes 230 arranged concentric about the longitudinal axis 202 with a second bolt pattern. In one embodiment, the disk 206 includes a tube 208 having a first end 210 and a second end 212 opposite the first end 210. The first end 210 is connected to a rim extension segment 207 (FIG. 2C). As illustrated, the tube 208 is arranged concentrically about the longitudinal axis 202 and extends along the longitudinal axis 202. The second end 212 has a ring 214 including the plurality of first and second holes 228, 230, formed in a circle.

FIG. 2B illustrates the wheel 200 of FIG. 2A viewed along the longitudinal axis 202, according to an embodiment of the present invention, and FIG. 2C is a section view A-A' of FIG. 2B, according to an embodiment of the present invention. Referring now to FIGS. 2B and 2C, the number of holes 228, 230 formed in the ring 214 may depend upon, for example, a diameter 218 of the circle of the plurality of holes, the diameter 220 of each hole, configuration of the spacing between the holes, the type of material (e.g., steel or aluminum) forming the tube 208 and the rim extension segment 207, and/or configuration of the rim 204 of the wheel 200, as based on, for example, tire size accommodated by the rim 204.

According to an exemplary embodiment of the invention, the rim 204 of the wheel 200 is configured to receive a 710 mm wide tire. As illustrated (FIG. 2C), an offset distance 222 is defined to be a distance between the second end 212 of the tube 208 and a center 224 of the wheel 200. In one embodiment of the present invention, the offset distance 222 is 430 mm. In another embodiment of the present invention, a length 225 (FIG. 2C) of the tube 208 (i.e., a distance between the second end 212 and the first end 210 of the tube 208) is 204 mm. In this embodiment, and as illustrated (FIG. 2C), a length 227 to which the rim extension segment 207 extends along the longitudinal axis 202 is approximately ⅓ of the difference between the offset 222 and the length 225 of the tube 208, which is approximately 75 mm.

Conventional wheels for receiving a narrower tire of, for example, width 620 mm, which do not include the tube 208, include a conventional disk (i.e., conventional rim extension segment) that extends approximately 250 mm along the longitudinal axis of the wheel for providing a minimum offset distance for operating a dual wheel assembly. However, advantageously, the tube 208 (connected to the rim extension segment 207 of the wheel 200) of the present invention provides a majority of the minimum offset distance for operating a dual wheel system. The minimum offset distance provides enough space between dual wheels to prevent the tires of the wheels from touching under extreme loads (i.e., when the tires of the wheels flatten and widen), and allows mud or other debris that has accumulated between the two tires of the two wheels to fall away.

The respective tubes 208 of two wheels 200 also provide that the diameter 218 of the circle of the first and second plurality of holes 228, 230 of both tubes 208, by which the two wheels 200 are mounted to each other (as inner and outer wheels 144, 142 of the dual wheel system 140) via a transition plate 300 (to be discussed further below in conjunction with FIG. 3), is larger than a conventional diameter of holes 240 of the axle flange 160 (FIG. 3) to which conventional wheels of a dual wheel assembly are mounted. Mounting wheels 200 to each other via the first and second plurality of holes 228, 230 located at a radius on the rims 204 that is larger than the radius of the conventional located holes 240 of the axle flange by which conventional wheels are mounted to each other reduces stress on the rims 204 and any rim extensions, and allows the number of first and second plurality of holes 228, 230 for mounting two wheels 200 to one another (via an outer ring of holes 302 (FIG. 3) of the transition plate 300) to be larger than the number of holes 240 conventionally used via the axle flange 160.

In one embodiment of the invention, the first and second plurality of holes 228, 230 are positioned on the largest possible diameter 218 to be able to accommodate the largest number of holes so that two wheels 200 can be firmly fixed on the transition plate 300 with as many fasteners as possible.

Furthermore, in order to provide a proper minimum offset for dual wheels having 710 mm wide mounted tires, a convention dual system would have to extend (i.e., draw) the rim extension segment 207 of each wheel well over the 250 mm that is typically used for 620 mm tires. Thus, in manufacturing convention wheels for a conventional dual wheel system, the rim extension segments of each wheel would be drawn too thin, resulting in rims that are susceptible to metal fatigue and/or failure. Furthermore, manufacture of such conventional wheels for 710 mm tires would be cost prohibitive, since special tools would need to be developed for performing such deep draws. Since the tube 208 of the present invention is not formed by a drawing process, but instead may be formed by welding together pieces of piping used in the oil and gas industry, not only can the tube 208 be formed with thicker side walls as compared to a drawn-out rim extension segment of a conventional dual wheel, but the rim extension segment 207 of the present invention is much shorted in length as measured along the longitudinal axis 202 as compared to the length of a rim extension of a conventional wheel, and thus the rim extension segment 207 of the present invention can sustain more stress, thereby resulting is a smaller probability of fatigue and/or failure.

In another embodiment, and as illustrated (FIG. 2B), the diameter 218 of the circle of the first and second plurality of holes 228, 230 of the ring 214 of the disk 206 is 650 mm. In yet another embodiment, and as illustrated, the first and second plurality of holes includes 30 holes, however as discussed above, the scope of the present invention covers any number of plurality of holes, depending upon a variety of factors, including, but not limited to, wheel size, tire size, amount of offset distance, and/or strength of material comprising the wheel 200, and in particular, the disk 206.

FIG. 3 illustrates an exploded view of the dual wheel system 140 of FIG. 1, according to an embodiment of the present invention. The dual wheel system 140 includes the inner wheel 144 (also referred to as a first wheel) and the outer wheel 142 (also referred to as a second wheel), each identical to one another and identical to the wheel 200 described in conjunction with FIGS. 2A-2C. The dual wheel system 140 also includes a transition plate 300. As explained more fully below, the transition plate 300 has an outer ring of holes 302 including a first subset of holes 308 and a second subset of holes 312 for connecting the transition plate 300 to the outer and inner wheels 142, 144, and an inner ring of holes 304 for connecting the transition plate 300 to the axle flange 160. In one embodiment, the first subset of holes 308 of the outer ring of holes 302 align with the first plurality of holes 228 of the first wheel 144 for fastening therewith via a first plurality of fasteners 306, and the second subset of holes 312 of the outer ring of holes 302 align with the second plurality of holes 230 of the second wheel 142 for fastening therewith via a second plurality of fasteners 310.

Referring back to FIG. 2B, and as illustrated, the plurality of first and second holes 228, 230 include 30 holes, and each hole is separated from its closest neighboring holes by 12°. A first hole 228A of the first plurality of holes 228 is formed at a 6° offset with respect to the section line A-A' of FIG. 2B. In one embodiment when the holes are consecutively number in a clockwise sense beginning with the first hole 228A labeled hole 1, then holes 228, 230 that are odd-numbered (i.e., holes 1, 3, 5, . . . 29) form the first plurality of holes 228, and holes 228, 230 that are even-numbered (i.e., holes 2, 4, 6, . . . 30) form the second plurality of holes 230. Thus in one embodiment, and as illustrated in FIG. 3, the inner wheel 144 is mounted to the transition plate 300 via a first plurality of fasteners 306 placed through the first plurality of holes 228 of the disk 206 of the inner wheel 144, where the first plurality of fasteners 306 are received and secured (i.e., connected) by. the aligned first subset of holes 308 of the outer ring of holes 302.

Furthermore, the outer wheel 142 is mounted to the transition plate 300 via a second plurality of fasteners 310 placed through the second plurality of holes 230 of the disk 206 of the outer wheel 142, where the second plurality of fasteners 310 are received and secured (i.e., connected) by the aligned second subset of holes 312 of the outer ring of holes 302. In one embodiment, the first and second subset of holes 308, 312 of the outer ring of holes 302 are threaded, the first and second plurality of holes 228, 230 are threaded, and the first and second plurality of fasteners 306, 310 include threaded bolts.

Referring again to FIG. 2B, the disk 206 of the wheel 200 may have a third plurality of holes 232A-H, arranged concentric about the longitudinal axis 202, and configured for receiving guiding studs. In one embodiment of the invention, the third plurality of holes 232A-H include 8 holes. For example, the third plurality of holes 232A-H of the disk 206 include, as measured clockwise with respect to the A-A' axis, a first stud hole 232A at 0°, a second stud hole 232B at 12°, a third stud hole 232C at 84°, a fourth stud hole 232D at 96°, a fifth stud hole 232E at 180°, a sixth stud hole 232F at 192°, a seventh stud hole 232G at 264°, and an eight stud hole 232H at 276°.

Referring to FIG. 3, the outer ring of holes 302 of the transition plate 300 may also include a third subset of holes 234A-H aligned with the third plurality of holes 232A-H of the disks 206. In one embodiment, the third subset of holes 234A-H of the transition plate 300 are threaded for connecting with a first set of guiding studs 236 (only three of which are shown) for guiding the disks 206 of the first and the second wheels 144, 142 to the transition plate 300 via the third plurality of holes 232A-H of the disks 206. In addition, the ring of threaded holes 240 of the axle flange 160 are aligned with the inner ring of holes 304 of the transition plate 300 for fastening the transition plate 300 to the axle flange 160 via a third plurality of fasteners 311. In one embodiment, the ring of threaded holes 240 of the axle flange 160 and the inner ring of holes 304 of the transition plate 300 each include 20 holes. In an alternate embodiment, some of the holes of the ring of threaded holes 240 of the axle flange 160 are configured to connect with a second set of guiding studs 242 (only one of which is shown) to be received via corresponding holes of the inner ring of holes 304 of the transition plate 300 for guiding the transition plate into position with the axle flange 160.

In another embodiment of the invention, the inner ring of holes 304 of the transition plate 300 are not threaded and the third plurality of fasteners 312 include threaded bolts. In both embodiments, the third plurality of fasteners 312 connect the transition plate 300 to the axle flange 160 via the aligned inner ring of threaded holes 240 of the axle flange 160. In another embodiment, the third plurality of fasteners 312 comprise both threaded bolts and spacers. The spacers enable the use of longer threaded bolts, thereby enabling a more secure fastening of the transition plate 300 to the axle flange 160.

In another embodiment of the invention, a width 314 of the transition plate 300 is 30 mm (FIG. 3). In one embodiment, the inner ring of holes 304 of the transition plate 300 includes 20 holes. In yet another embodiment, each hole of the inner ring of holes 304 of the transition plate 300 has a same diameter.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A dual wheel system for use with a work vehicle, comprising:

a first wheel including a rim with a disk positioned transverse to a longitudinal axis, the disk of the first wheel having a first plurality of holes arranged concentric about the longitudinal axis with a first bolt pattern;

a second wheel including a rim with a disk positioned transverse to the longitudinal axis, the disk of the second wheel having a second plurality of holes arranged concentric about the longitudinal axis with a second bolt pattern; and a transition plate arranged between the first wheel and the second wheel, the transition plate including an inner ring of holes and an outer ring of holes, the outer ring of holes including a first subset of holes and a second subset of holes, the first subset of holes aligning with the first plurality of holes of the first wheel and fastened therewith by a first plurality of fasteners, the second subset of holes aligning with the second plurality of holes of the second wheel and fastened therewith by a second plurality of fasteners, the inner ring of holes being fastened with an axle flange of the work vehicle by a third plurality of fasteners.

2. The dual wheel system of claim 1, wherein said first subset and said second subset of holes of said outer ring of holes of said transition plate are threaded, wherein the first plurality of holes of the first wheel and the second plurality of holes of the second wheel are threaded, and wherein said first and said second plurality of fasteners are threaded bolts.

3. The dual wheel system of a claim 1, wherein said third plurality of fasteners are threaded bolts.

4. The dual wheel system of claim 3, wherein said third plurality of fasteners further comprise spacers.

5. The dual wheel system of claim 1, wherein said rim of said first and said second wheel are configured to receive a 710 mm wide tire.

6. The dual wheel system of claim 1, wherein the disk includes a tube and a rim extension segment, said tube having a first end and a second end opposite said first end, said first end connected to said rim extension segment, said tube arranged concentric about said longitudinal axis and extending along said longitudinal axis, said second end having a ring, said ring having the first plurality of holes of the first wheel and the second plurality of holes of the second wheel.

7. The dual wheel system of claim 6, wherein a distance between said second end of said tube of said first wheel and a center of said first wheel is a first offset distance, wherein a distance between said second end of said tube of said second wheel and a center of said second wheel is a second offset distance, wherein said first offset distance is 430 mm and said second offset distance is 430 mm, and wherein a width of said transition plate is 30 mm.

8. The dual wheel system of claim 7, wherein a distance between said second end and said first end of said tube of said first wheel is 204 mm, and wherein a distance between said second end and said first end of said tube of said second wheel is 204 mm.

9. The dual wheel system of claim 1, wherein a diameter of said inner ring of holes of said transition plate is 335 mm.

10. The dual wheel system of claim 1, wherein said inner ring of holes of said transition plate comprises 20 holes.

11. The dual wheel system of claim 1, wherein each hole of said inner ring of holes of said transition plate has a same diameter.

12. The dual wheel system of claim 1, wherein said first subset of holes of said outer ring of holes comprises 15 holes, wherein said first plurality of holes of the first wheel comprises 15 holes, wherein said second subset of holes of said outer ring of holes comprises 15 holes, wherein said second plurality of holes of the second wheel comprises 15 holes, and wherein each hole of said first and second plurality of holes has a same diameter.

13. A work vehicle comprising:

two front wheel assemblies; and two back wheel assemblies, wherein at least each of said two front wheel assemblies include a dual wheel system, and wherein said dual wheel system comprises:

a first wheel including a rim with a disk positioned transverse to a longitudinal axis, the disk of the first wheel having a first plurality of holes arranged concentric about the longitudinal axis with a first bolt pattern;

a second wheel including a rim with a disk positioned transverse to the longitudinal axis, the disk of the second wheel having a second plurality of holes arranged concentric about the longitudinal axis with a second bolt pattern; and a transition plate arranged between the first wheel and the second wheel, the transition plate including an inner ring of holes and an outer ring of holes, the outer ring of holes including a first subset of holes and a second subset of holes, the first subset of holes aligning with the first plurality of holes of the first wheel and fastened therewith by a first plurality of fasteners, the second subset of holes aligning with the second plurality of holes of the second wheel and fastened therewith by a second plurality of fasteners, the inner ring of holes being fastened with an axle flange of the work vehicle by a third plurality of fasteners.

14. A method of replacing an existing wheel assembly of a work vehicle with a replacement wheel assembly, said existing wheel assembly connected to an axle flange of said work vehicle, said method comprising:

removing said existing wheel assembly from said axle flange of said work vehicle; and fastening said replacement wheel assembly to said axle flange of said work vehicle, wherein said replacement wheel assembly comprises a dual wheel system including a first wheel having a rim with a disk positioned transverse to a longitudinal axis, the disk of the first wheel having a first plurality of holes arranged concentric about the longitudinal axis with a first bolt pattern, a second wheel having a rim with a disk positioned transverse to the longitudinal axis, the disk of the second wheel having a second plurality of holes arranged concentric about the longitudinal axis with a second bolt pattern, and a transition plate including an inner ring of holes and an outer ring of holes, the outer ring of holes including a first subset of holes and a second subset of holes, the first subset of holes configured to be aligned with the first plurality of holes of the first wheel, the second subset of holes configured to be aligned with the second plurality of holes of the second wheel, and the inner ring of holes configured to be aligned with holes of the axle flange of the work vehicle, and wherein fastening said replacement wheel assembly comprises:

fastening said first wheel to said transition plate by placing a first plurality of fasteners through said first plurality of holes of said disk of said first wheel into said first subset of holes of said outer ring of holes of said transition plate;

fastening said transition plate to said axle flange of said work vehicle by placing a third plurality of fasteners through said inner ring of holes of said transition plate into said holes of said axle flange; and fastening said second wheel to said transition plate by placing a second plurality of fasteners through said second plurality of holes of said disk of said second wheel into said second subset of holes of said outer ring of holes of said transition plate, wherein said first wheel is an inner wheel and said second wheel is an outer wheel.

* * * * *